June 1, 1937. W. BRADLEY 2,082,378
BRAKE CONTROLLED MECHANISM
Filed April 25, 1935
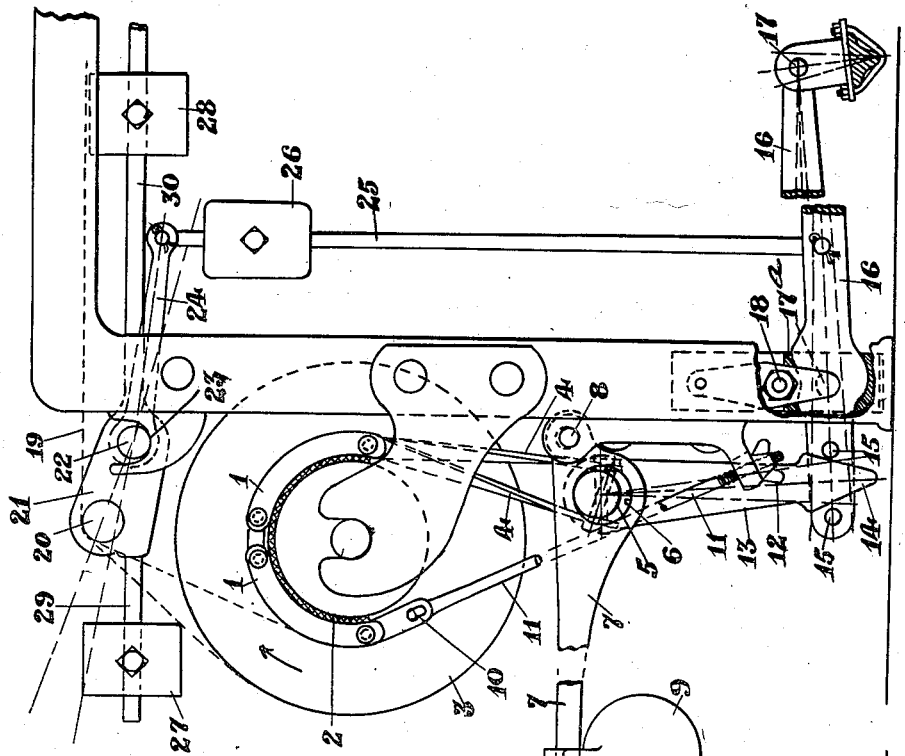
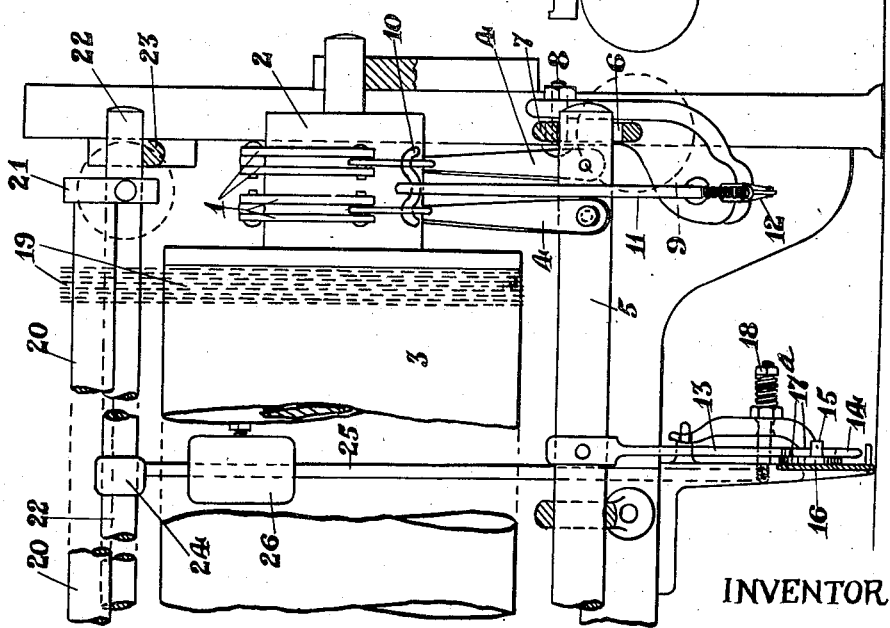
INVENTOR
William Bradley
By Eugene E. Stevens
ATTY Patented June 1, 1937

2,082,378

UNITED STATES PATENT OFFICE 2,082,378

BRAKE CONTROLLED MECHANISM

William Bradley, Addingham, England

Application April 25, 1935, Serial No. 18,235
In Great Britain June 7, 1934

11 Claims. (Cl. 188—83)

This invention relates to a method of and means for controlling the friction let-off mechanism of a loom, or for controlling the movement of a rotary or like moving surface acting under the retardation of a brake.

According to this invention two braking members are adapted to be simultaneously and continuously or intermittently moved in opposite directions and alternately exert and maintain or permit a turning action or moment on a rotary member. These movements of the braking members eliminate the increased torque that is required to turn the rotary member from a state of rest, they can also be utilized to hold the latter in a balanced condition against a load and allow it to turn in one direction or the other when the load is increased, or reduced, they may also turn the rotary member against a constant load in a direction which can be reversed at will, they can further be utilized to exert a turning action or moment on the rotary member in a direction that is contrary to a force that is turning it in an opposite direction so that when such force is removed, or sufficiently relieved, the braking members will turn the rotary member in an opposite direction to that in which it was being turned by the aforesaid force. Means are provided for increasing or decreasing the friction and/or rate of movement between the braking members and the rotary member to suit any particular requirement and means may also be provided for automatically varying the friction or rate of movement to maintain a constant torque under a variable load.

For the purpose of the invention a pair of braking members are mounted in parallel on a rotary member and are attached at one end to two arms of a lever that is centrally pivoted between the points of connection and is provided with means whereby an oscillatory motion can be imparted to it. The other end of the braking members may be attached to a similar operating lever, which can be actuated to reverse the direction of rotation of the rotary member, or to a lever that is centrally pivoted between the points of connection to a member that is capable of adjusting and/or positioning the braking members to suit any particular requirement. With this construction when an oscillatory motion is imparted to the operating lever, the two braking members are simultaneously moved in opposite directions, and alternately exert and maintain a turning action or moment on the rotary member, one braking member exerting a major turning action or moment on the rotary member whilst the other is slipping and exerting a minor and negative turning action or moment thereon and vice versa. If two operating levers are employed at opposite sides of the rotary member, movement imparted to one lever will exert a turning action or moment on the rotary member in one direction and movement imparted to the other lever will exert a turning action or moment on the rotary member in the opposite direction. If a force is applied to the rotary member to turn it in the opposite direction to the torque exerted by the braking members, it will automatically reverse as soon as the force is removed or sufficiently relieved.

The torque exerted by the braking members on the rotary member can be carried by altering or interrupting the stroke or amplitude of the rocking lever, or levers, the period or frequency of rocking, the load on the braking members, or a combination of any of such variations.

Owing to the brake controlled mechanism functioning in the manner described it is rendered particularly applicable for controlling the friction of a let-off mechanism of a loom or to analogous apparatus for other purposes as by its use the warp or its equivalent can be kept at an even average tension, increased starting resistance that is normally offered by the warp beam to turning after the loom has been stopped for short or long periods is eliminated, and the consequent stretching and formation of thick and thin places and other defects in the warp threads are prevented. Turning or creeping of the beam when under sustained tension with the loom stopped is prevented by the fact that the retarding action of the brake is considerably above normal when in a static condition.

In the accompanying drawings:—

Fig. 1 is a rear elevation and Fig. 2 an end elevation showing a loom let-off motion incorporating the invention.

In applying the invention to a loom let-off motion such as that illustrated by the drawings, a pair of articulated and oppositely moving brake members 1 are mounted in parallel on each neck or ruffle 2 of the warp beam 3. The articulated brake members 1 may be dispensed with if desired and brake bands substituted therefor. The brake members 1 have one pair of adjacent ends thereof attached to ends of the arms 4. The other ends of the arms 4 are fastened in any suitable manner to the shaft 5. In effect the arms 4 and the shaft 5 comprise a two armed lever and it is apparent that rocking of the shaft 5 in one direction will actuate the arms 4 and brake members 1 in opposite directions. The shaft 5 freely rocks in oversize bearings 6 which are formed in identical levers 7, only one of which is shown and only one of which is described. The bearings 6 are oversized in order to permit the rocking of the shaft 5 therein with a minimum of friction.

The lever 7 is fulcrumed at 8 and the arm thereof is fitted with a movable weight or the like 9. Rigidly fixed on the shaft 5 is an arm 13 which is formed with a wedge-shaped free end 14. The wedge-shaped end 14 is adapted to be alternately engaged by two spaced pins 15 which extend laterally from an arm 16 adjacent one end thereof. The arm 16 is fulcrumed at 17 and is adapted to be reciprocated horizontally by any suitable means (not shown). Vertical movement is imparted to the arm 16 by the link 25 which is pivotally attached to the arm 16 between the free end thereof and the fulcrum 17. The vertical movement of the arm 16 is damped or retarded when desired by suitable opposed friction surfaces 17a which are provided on either side of said arm 16. Pressure of the friction surfaces 17a on the arm 16 is regulated in any suitable manner, as by the nut 18.

The other adjacent pair of ends of the brake members 1 are connected by a cross connector 10 the center of which has a freely rocking connection with an end of a link 11. The other end of the link 11 is threaded and adjustably anchored to the loom frame by means of the nut 12. By tightening or loosening the nut 12, the working range of the lever 7 may be adjusted.

The warp 19 passes from the warp beam 3 over a movable back bearer 20 that is freely rotatable in, and which is carried by, arms 21 that are fixed on a shaft 22, which in turn, is mounted for free rotation in bearings 23 on the loom frame. An arm 24 is rigidly fixed on the shaft 22 and is connected by a link 25 to the arm 16. The link 25 carries a weight 26. Weights 27 and 28 adjustable on their respective arms 29 and 30 are carried by the shaft 22 on opposite sides thereof and exert a turning moment on the same. By adjusting the weights 27 and 28 on their respective arms 29 and 30, the initial tension on the warp may be varied to suit.

When the loom is at rest, the pressure of the friction surfaces 17a on the arm 16 is sufficient to hold that member and the back bearer 20 stationary. When the loom is in motion, a substantially horizontal reciprocating movement is imparted to the arm 16, as aforesaid, and such movement is transmitted in varying proportions through arm 13, shaft 5 and arms 4 to the brake members 1. This causes simultaneous movement in opposite directions of the brake shoes 1, as aforesaid, through distances which are governed by variations in the tension of the warp. That is to say, if such tension increases, more weight is exerted on the back bearer 20 and its arm 21 is forced down, this raises the arm 24, link 25 and arm 16. Raising the arm 16 places the pins 15 thereon nearer the base of the wedge-shaped end 14 of the arm 13. Hence, the reciprocating movement of the arm 16 will swing the arm 13 through a greater arc, and consequently increase the movement of the brake members 1. The increased movement of the brake shoes acts to let off more warp to relieve the tension. Thus, even though the brake members move in opposite directions and exert opposite directional frictional force on the beam, the beam is rotated in but one direction and is not rocked back and forth. This is because of the fact that the beam or roll 3 is normally turning in one direction already and, consequently, that brake member 1 which is moving in the same direction as the beam will exert a major turning movement thereon while that brake 1 which is moving in a direction opposed to the direction of rotation of the beam will exert but a minor turning action thereon which will be insufficient to overcome the other forces and stop or change the direction of rotation.

Moreover, the direction in which the beam is rotated is controlled by the position of the shaft 5 with respect thereto. For instance when the beam 3 is stationary with the shaft 5 to the right of the axis of the beam 3 (as shown), operation of braking members as described will rotate the beam in a clockwise direction. Were the shaft 5 to the left of the axis of the beam 3 with the arms 4 extending up the left side of the beam axis and with the other parts correspondingly reversed, the beam would be rotated in a counter-clockwise direction from a stationary state.

This movement is caused by a slightly increased or major turning movement which is imparted to the beam 3 in a clockwise direction by the braking members 1 which operate as follows:

When the shaft 5 is rocked in a clockwise direction, the right hand arm 4 (Fig. 2) exerts a clockwise pull on the right hand brake member 1 (Fig. 1). Simultaneously, the left hand arm 4 pushes the left hand brake 1 and a counter-clockwise pull is exerted on the left hand brake 1 by reason of the tilting of the connection 10.

Thus a distinct major and minor turning force is exerted when the shaft 5 is rocked in a clockwise direction.

Similarly, when the shaft 5 rocks back in a counter-clockwise direction there is a reverse movement of the arms 4 and brakes 1. Nevertheless, the major pull of the left hand brake is then exerted in a clockwise direction.

This pull exerted by the tilting of the member 10 is not quite as powerful as the pull exerted by the other brake member and in a sense, may be likened to the minor pull of the slack side of a belt on the bottom of a pulley.

If the tension decreases to too great a degree, the reverse of the above described operation takes place and the pins 15 are placed adjacent the apex of the wedge-shaped end 14 of the arm 13. This will reduce the arc of the arm 13 and consequently decreases the movement of the brake members 1 to retard the letting off of warp, or to stop the letting off of warp altogether if no warp is required to be let off.

The back bearer 20 is so disposed and balanced that it at all times transmits a practically constant force to the arm 16 when the tension of the warp is normal. As aforesaid, the brake members 1 respond to variations in tension of the warp due to the shedding action, or similar causes, by permitting a minute plus or minus movement of the beam over or under that usually permitted for each half pick if required. The action of the brake shoes is such that, when and as required, the beam may be held fast, permitted to move, or compelled to move, so as to hold, release, or expend the warp.

What I claim as my invention and desire to secure by Letters Patent in the United States is:—

1. A loom let-off motion comprising a pair of oppositely moving braking members mounted in parallel on each ruffle of the warp beam, said braking members being attached at one end to two arms of a lever, said lever being centrally pivoted between the points of connection, means for imparting an oscillatory movement to said lever, a centrally pivoted cross connector connecting the other end of said braking members, and means connected to said cross connector for adjusting the tensity and position of said braking members.

2. The structure of claim 1, a moving member, a braking surface arranged in frictional contact with said moving member, means for controlling the amount of movement imparted to said braking members, said means comprising means for utilizing variations in the tension of the warp to impart a variable movement to said moving member.

3. The structure of claim 1, said means for imparting oscillatory movement to said lever comprising a horizontally reciprocating arm, said arm being provided with spaced abutments for engagement with the wedge-shaped end of a second arm, and said second arm being operably connected with said lever.

4. The structure of claim 1, said means for imparting oscillatory movement to said lever comprising a horizontally reciprocating arm, said arm being provided with spaced abutments for engagement with the wedge-shaped end of a second arm, said second arm being operably connected with said lever, a friction member for retarding the movement of said reciprocating arm, a movable back bearer on said loom, an operative connection between said back bearer and said reciprocating arm for raising or lowering the latter in accordance with the tension of the warp passing over said back bearer to vary the amount of movement imparted to said second named arm by said reciprocating arm.

5. In brake or friction controlled mechanism, a rotary member, two braking members cooperating therewith and means for simultaneously moving said braking members in opposite directions to exert opposite directional forces on said rotary member, the force exerted by one braking member exerting a major turning action on said rotary member and the force exerted by oppositely moving braking member exerting a minor turning action on said member.

6. The structure of claim 5 and means for adjusting the friction exerted by the braking members on the rotary member.

7. The structure of claim 5 and means for automatically varying the rate of movement of the oppositely moving braking members.

8. In brake or friction controlled mechanism, a rotary member, two braking members mounted in parallel thereon and cooperating therewith, a centrally pivoted two-armed lever, connections from the ends of the arms to the ends of the braking members at one side of the rotary member whereby oscillation of said two-armed lever moves said braking members simultaneously in opposite directions, means for imparting an oscillatory motion to the two-armed lever, a point of attachment, connections from the ends of the braking members at the other side of the rotary member to the point of attachment and means for adjusting the braking members.

9. In brake or friction controlled mechanism, a rotary member, two braking members mounted in parallel thereon, a centrally pivoted two-armed lever, connections from the ends of the arms to the ends of the braking members at one side of the rotary member, a point of attachment, connections from the ends of the braking members at the other side of the rotary member to the point of attachment, means for imparting an oscillatory movement to the two-armed lever, said movement acting to move said braking members simultaneously in opposite directions, means for varying the movement of such lever and means for adjusting the load on the braking member.

10. In a loom let-off motion incorporating brake or friction controlled mechanism, the combination of a warp beam, a pair of oppositely movable braking members mounted in parallel on each neck of the warp beam, means for moving said braking members simultaneously in opposite directions, a centrally pivoted two-armed lever, attachments from the ends of such levers to the ends of the braking members at one side of the warp beam neck, a centrally pivoted cross connector attached to the ends of the braking members at the other side of the warp beam neck, a point of attachment, a connection from same to the cross connector and means for adjusting the braking member.

11. In a loom let-off motion incorporating brake or friction controlled mechanism, the combination of a warp beam, a pair of oppositely moving braking members mounted in parallel on each neck of the warp beam, a centrally pivoted two-armed lever, attachments from the ends of such lever to the ends of the braking members at one side of the warp beam neck, a centrally pivoted cross connector attached to the ends of the braking members at the other side of the warp beam neck, a point of attachment, a connection from same to the cross connector, means for adjusting the braking members, a shaft free to roll in bearings, arms fixed to such shaft, a warp controlled roller free to rotate on said arms, an arm extending from the opposite side of said shaft, a continuously reciprocating member, a connection from such member to the last mentioned arm, an arrangement of balance weights at opposite sides of the shaft which carries the warp controlled roller, an operative connection between the continuously reciprocating member and the centrally pivoted two-armed lever whereby the continuously reciprocating member is moved from positions whereat it transmits at least a part of its reciprocating movement to said braking members, to a position whereat it transmits none of its reciprocating movement to said members, according to the requirements for warp.

WILLIAM BRADLEY.